US011378013B2

(12) United States Patent
Brust et al.

(10) Patent No.: US 11,378,013 B2
(45) Date of Patent: Jul. 5, 2022

(54) BRACKET ASSEMBLY FOR SUPPORTING TERMINAL LEADS IN AUXILIARY GENERATOR FOR AIRCRAFT

(71) Applicant: Hamilton Sundstrand Corporation, Charlotte, NC (US)

(72) Inventors: Eric A. Brust, Rockton, IL (US); Paul Henry Verstrate, Loves Park, IL (US); Anthony L. Biermann, Beloit, WI (US); Derek R. Hochstetler, Rockford, IL (US); Jose Rafael Relampagos Ridao, Gurnee, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/377,351

(22) Filed: Apr. 8, 2019

(65) Prior Publication Data

US 2020/0318552 A1 Oct. 8, 2020

(51) Int. Cl.
*H02K 3/52* (2006.01)
*H02K 5/22* (2006.01)
*H02K 3/50* (2006.01)
*H02K 5/24* (2006.01)
*F16M 13/00* (2006.01)
*F02C 7/32* (2006.01)
*B23K 37/04* (2006.01)
*B64D 41/00* (2006.01)
(Continued)

(52) U.S. Cl.
CPC ............ *F02C 7/32* (2013.01); *B23K 37/0435* (2013.01); *B64D 41/00* (2013.01); *F16M 13/02* (2013.01); *H02K 5/22* (2013.01); *H02K 1/18* (2013.01); *H02K 3/522* (2013.01); *H02K 5/24* (2013.01)

(58) Field of Classification Search
CPC ....... F02C 7/32; B23K 37/0435; B64D 41/00; F16M 13/02; H02K 5/22; H02K 1/185; H02K 5/24; H02K 3/50; H02K 3/52
See application file for complete search history.

(56) References Cited

U.S. PATENT DOCUMENTS 4,322,647 A * 3/1982 Neroda ................ H01R 4/2462
                                                     310/158
6,104,116 A    8/2000 Fuller et al.
(Continued)

FOREIGN PATENT DOCUMENTS

EP    2000675 A2    12/2008

OTHER PUBLICATIONS

Extended European Search Report dated Jun. 24, 2020, issued during the prosecution of European Patent Application No. EP 19212577.1.

(Continued)

*Primary Examiner* — Tan Le
(74) *Attorney, Agent, or Firm* — Locke Lord LLP; Joshua L. Jones; Scott D. Wofsy (57) ABSTRACT

A bracket assembly for supporting terminal leads in an auxiliary generator of an aircraft, which includes a first bracket adapted and configured to be fastened to a stator housing of the generator to retain a main stator within the stator housing, and a second bracket adapted and configured to be fastened to a top surface of the first bracket to support a plurality of terminal leads in such a manner so that they are not susceptible to damage from resonance and vibration.

15 Claims, 6 Drawing Sheets

(51) Int. Cl.
F16M 13/02 (2006.01)
H02K 1/18 (2006.01)

(56) References Cited

U.S. PATENT DOCUMENTS

| | | | |
|---|---|---|---|
| 2002/0056623 A1* | 5/2002 | Matsumoto | B60Q 1/1461 |
| | | | 200/61.54 |
| 2008/0073987 A1 | 3/2008 | Kataoka et al. | |
| 2012/0190250 A1* | 7/2012 | Patel | H02K 5/225 |
| | | | 439/709 |
| 2014/0319939 A1 | 10/2014 | Yamada et al. | |
| 2015/0280509 A1* | 10/2015 | Shi | H02K 5/14 |
| | | | 310/71 |
| 2017/0126092 A1* | 5/2017 | Han | H02K 1/2706 |
| 2019/0222092 A1* | 7/2019 | Hochstetler | H01R 9/24 |

OTHER PUBLICATIONS

Communication Pursuant to Art. 94(3) EPC dated Nov. 11, 2021, issued during the prosecution of European Patent Application No. EP 19212577.1.

* cited by examiner

BRACKET ASSEMBLY FOR SUPPORTING TERMINAL LEADS IN AUXILIARY GENERATOR FOR AIRCRAFT

BACKGROUND OF THE INVENTION

1. Field of the Invention

The subject invention is directed to a bracket assembly, and more particularly, to a two-piece bracket assembly for supporting a plurality of terminal leads within the stator housing of an auxiliary generator for an aircraft.

2. Description of Related Art

Many commercial passenger aircraft have an Auxiliary Power Unit (APU) that is used in conjunction with the main propulsion engines to provide a secondary source of power. An APU, typically in the form of an independent gas turbine engine, provides shaft power to drive a generator and interconnected electrical systems.

In certain auxiliary generators, there are a plurality of terminal leads that are located within a stator housing of the generator, transferring electrical output from the stator to external terminals for output to the aircraft. These terminal leads are typically unsupported within the housing and therefore subject to damage from vibration. More particularly, the braze joints used to connect the terminal leads to the terminal bock of the generator are susceptible to damage due to resonance and/or externally induced vibration.

The subject invention is directed to a novel bracket assembly that is adapted and configured to support the terminal leads within the stator housing in such a manner so that they are not susceptible to failure from resonance and vibration.

SUMMARY OF THE DISCLOSURE

The subject invention is directed to a new and useful bracket assembly for supporting terminal leads in an auxiliary generator of an aircraft. The bracket assembly includes a first bracket adapted and configured to be fastened to a stator housing of the generator to retain a main stator within the stator housing, and a second bracket adapted and configured to be fastened to a top surface of the first bracket for supporting a plurality of terminal leads within the stator housing.

In accordance with an embodiment of the subject invention, the first bracket assembly is adapted and configured to be fastened at existing fastener locations previously used for fastening a pair of circumferentially spaced apart stator flange washers. The second bracket includes a plurality of mounting locations to accommodate a plurality of terminal lead clamps. The bracket assembly further includes a plurality of terminal lead clamps for securing the terminal leads to a top surface of the second bracket.

The first bracket is formed from a metal material, and preferably, the first bracket is formed from steel. The second bracket is formed from a non-metallic material, and preferably, the second bracket is formed from a thermoset plastic. The first bracket has a generally arcuate configuration extending through a first arc length and the second bracket has a generally arcuate configuration extending through a second arc length that is less than the first arc length. Preferably, the first bracket has a stepped protrusion on a bottom surface thereof for contacting a stator sleeve to apply a preload force thereto to prevent vibration of the component parts of the bracket assembly.

The subject invention is also directed to a bracket assembly for supporting terminal leads in an auxiliary generator, which includes a first metallic bracket adapted and configured to be fastened to a stator housing of the generator at existing fasteners locations previously used for fastening a pair of circumferentially spaced apart stator flange washers, and serving to retain a main stator within the stator housing, and a second non-metallic bracket adapted and configured to be fastened to a top surface of the first bracket and including mounting locations for supporting a plurality of terminal lead clamps. In addition, the bracket assembly includes a plurality of terminal lead clamps for securing a corresponding number of terminal leads to a top surface of the second bracket.

These and other features of the bracket assembly of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those having ordinary skill in the art will readily understand how to make and use the subject invention without undue experimentation, preferred embodiments thereof will be described in detail herein below with reference to the figures wherein.

DETAILED DESCRIPTION OF THE PREFERRED EMBODIMENTS

Figure 1:
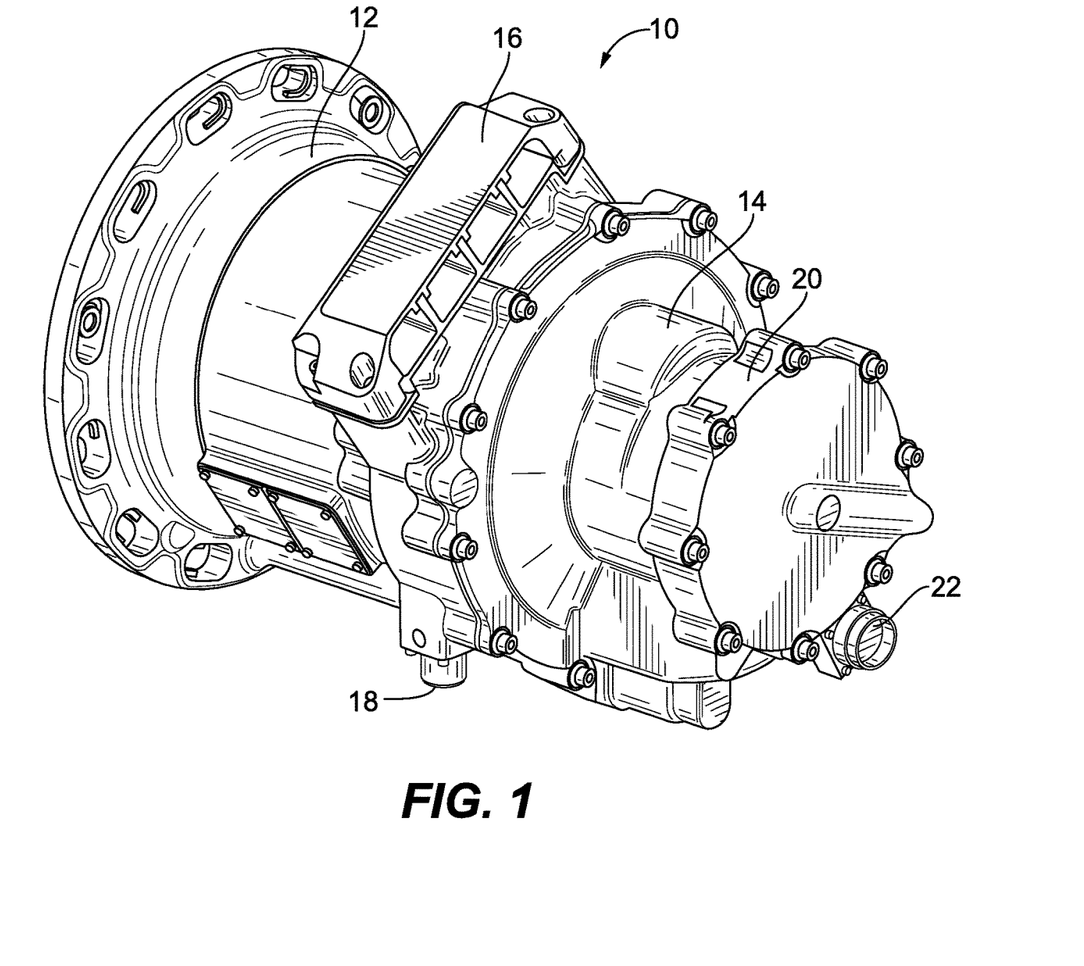
FIG. 1 is a perspective view of an auxiliary generator that includes the bracket assembly of the subject invention.

Referring now to the drawings wherein like reference numerals identify similar structural features or elements of the subject invention, there is illustrated in FIG. 1 an auxiliary generator that is designated generally by reference numeral 10, that includes the novel bracket assembly of the subject invention, which will be described in detail below.

Referring to FIG. 1, the auxiliary generator 10 forms part of the Auxiliary Power Unit (APU) of a commercial passenger aircraft. The generator 10 has an input stator housing 12 at one end which includes a terminal block 16 and an electrical connector 18. The generator 10 also includes an input shaft (not shown), a central stator housing 14 having another electrical connector 22, and a cover 20 that is bolted to the central stator housing 14.

Figure 2:
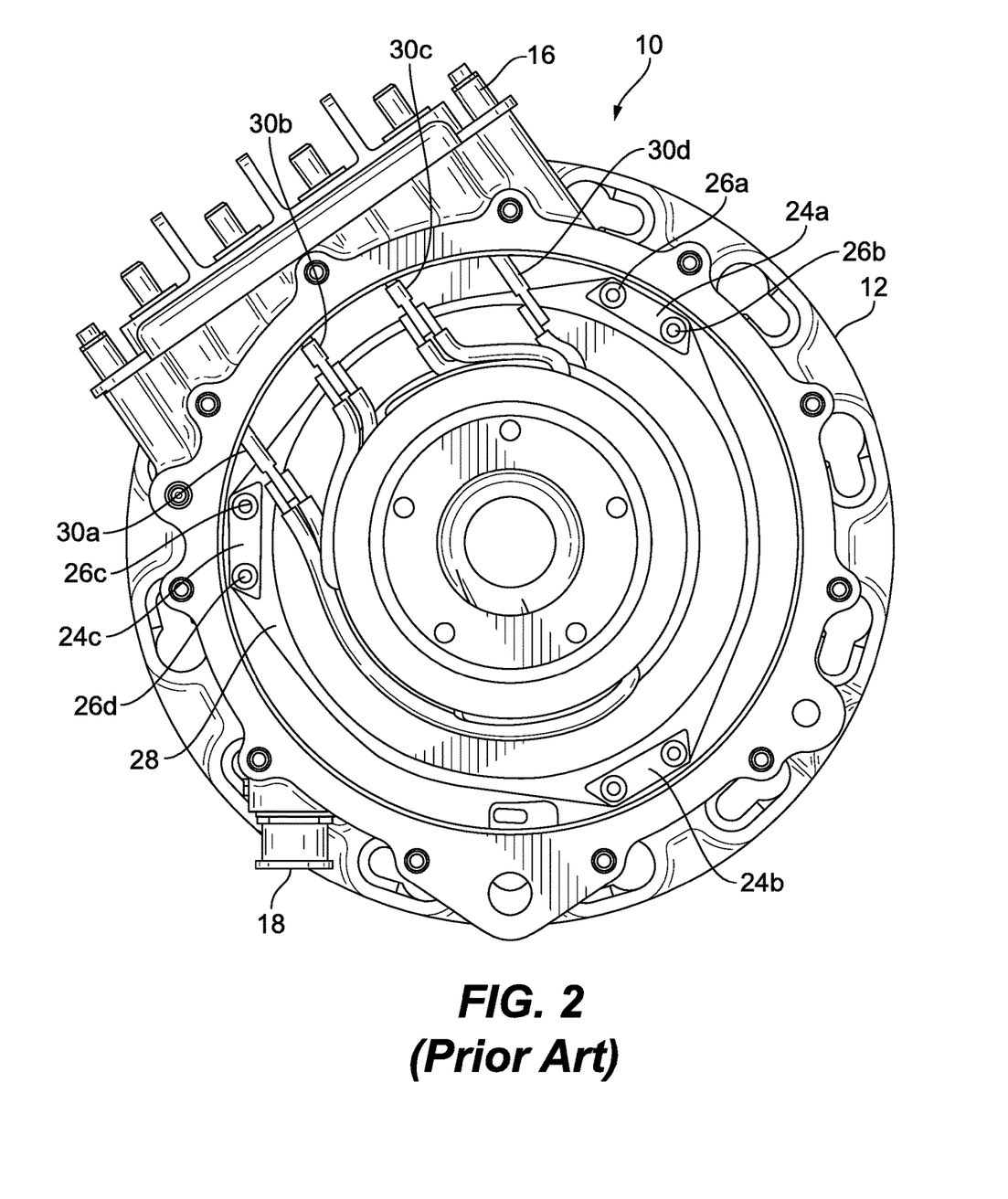
FIG. 2 is an interior elevational view of the auxiliary generator shown in FIG. 1, with the center housing and cover removed to illustrate the prior art configuration of the terminal leads, which are unsupported within the stator housing of the generator relative to the main stator, and which includes three circumferentially spaced apart stator flange washers.

Referring now to FIG. 2, which depicts a prior art configuration of the generator 10, there is located within the input stator housing 12, four terminal leads 30a-30d, which are associated with the terminal block 16. These include two outer terminal leads 30a, 30d and two inner terminal leads 30b, 30c. The outer terminal leads 30a, 30d are longer than the inner terminal leads 30b, 30c. These four terminal leads 30a-30d are individually connected to the terminal block 16 using typical braze joints. They are otherwise unsupported within the input stator housing 12 of the generator 10, and therefore they are subject to vibration damage. More particularly, it has been determined through testing and evaluation that the braze joints used to connect the four terminal leads 30a-30d to the terminal block 16 in the prior art configuration of generator 10 are susceptible to damage due to resonance and vibration, which is problematic.

With continuing reference to FIG. 2, in the prior art configuration of the generator 10, there are currently three circumferentially spaced apart stator flange washers 24a-24c that are fastened to the stator housing flange 28 at specific locations about the outer periphery of the input stator housing 12. These include flange washer 24a located at the 2 o'clock position, flange washer 24b located at the 6 o'clock position and flange washer 24c located at the 10 o'clock position.

In accordance with an embodiment of the subject invention, the flange washers 24a and 24c have been removed from the flange 28 of stator housing 12 and the mounting locations that were used for those two flange washers 24a, 24c are preferably used as mounting locations for a novel bracket assembly used to support the terminal leads 30a-30d in such a manner so that they are not susceptible to failure due to resonance and vibration. That is, in an improved configuration of generator 10, the two mounting locations 26a and 26b that are associated with washer 24a and the two mounting locations 26c and 26d that are associated with washer 24c are used as mounting locations for the novel bracket assembly of the subject invention.

Figure 3:
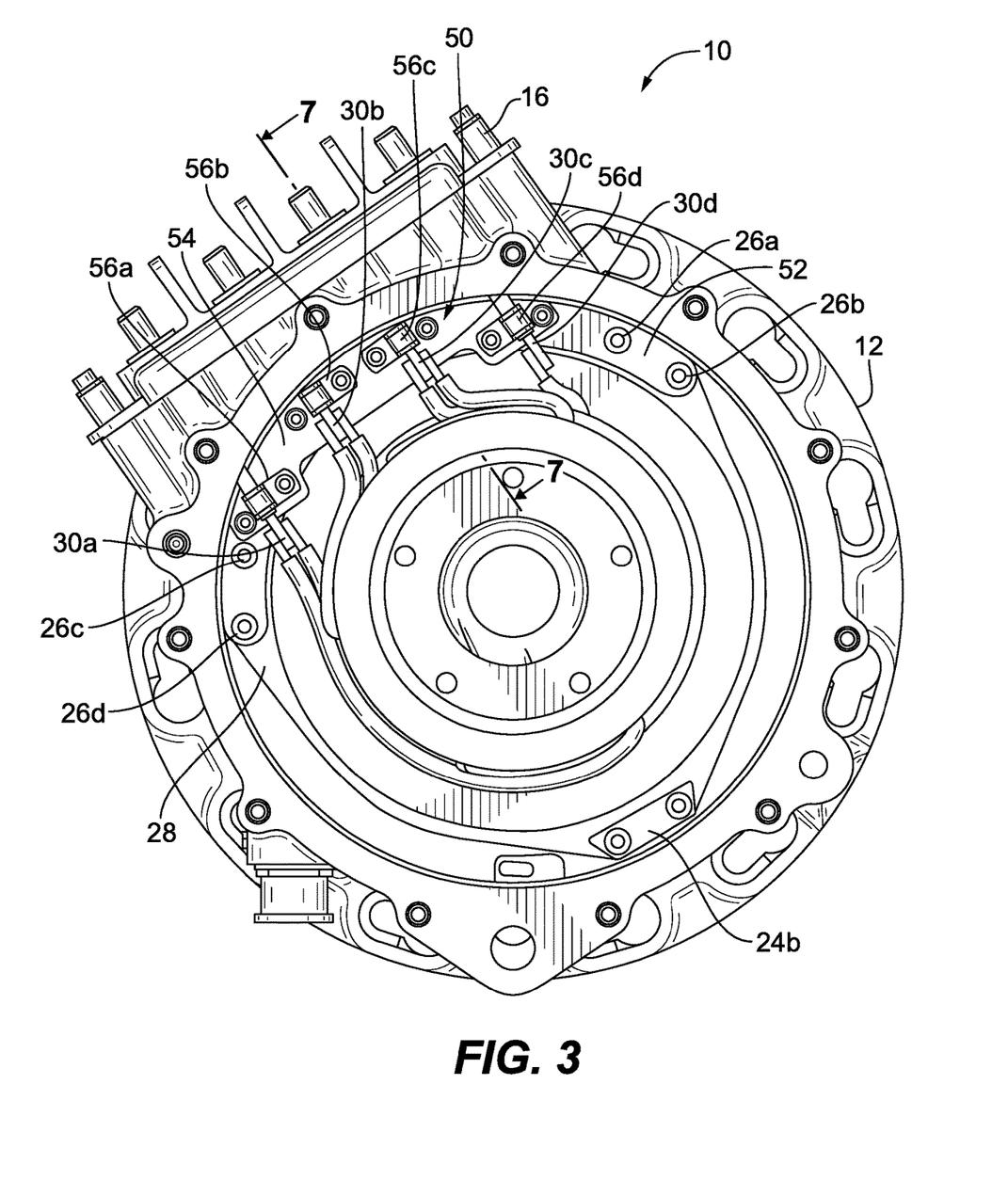
FIG. 3 is an interior elevational view of the auxiliary generator shown in FIG. 1, with the center housing and cover removed to illustrate the bracket assembly of the subject invention, which is installed in the stator housing to retain the main stator and restrain the terminal leads, using existing mounting locations of the stator flange washers.
Figure 4:
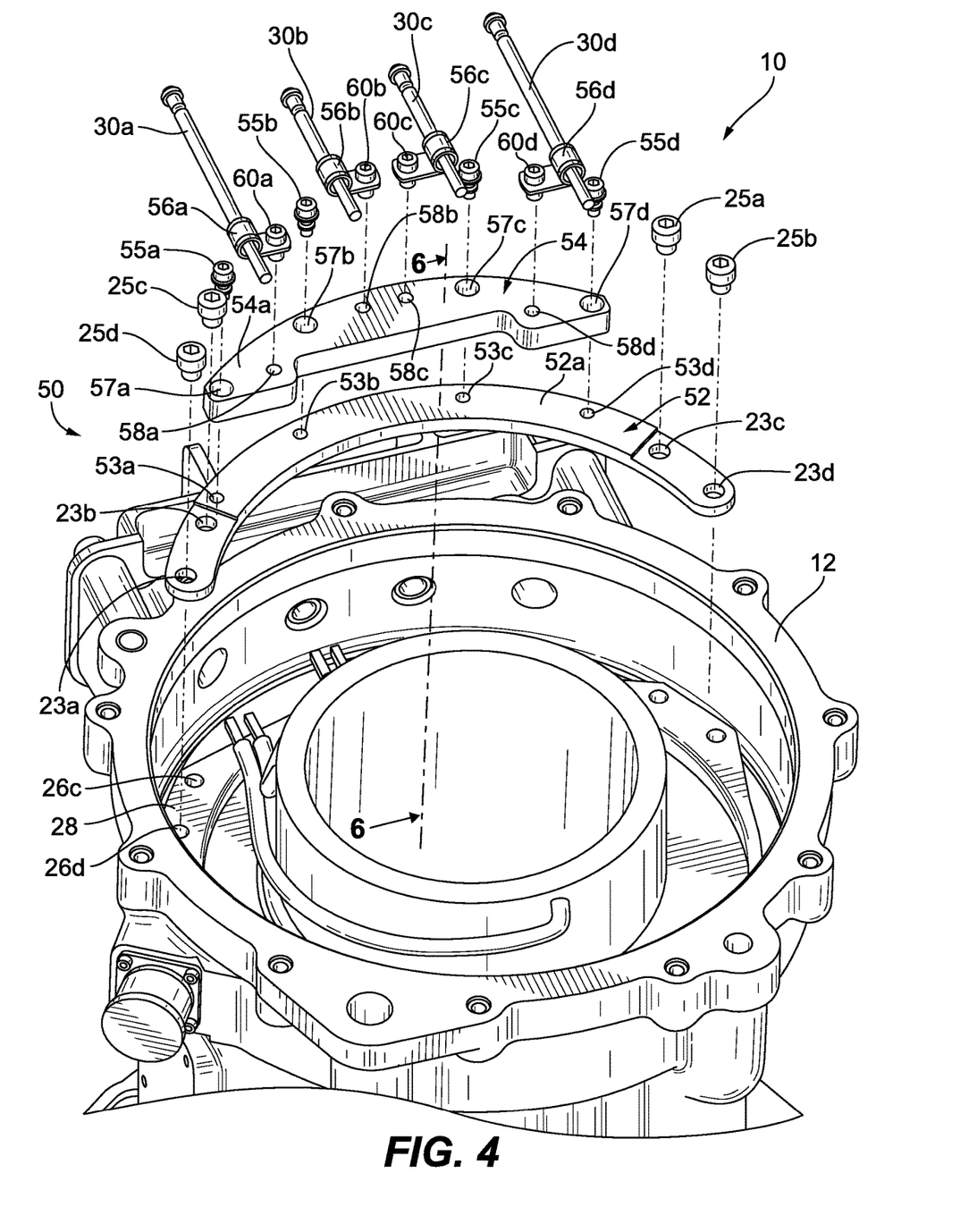
FIG. 4 is an exploded perspective view of the bracket assembly of the subject invention separated from the stator housing.

More particularly, as illustrated in FIGS. 3 and 4, the subject invention includes a bracket assembly designated generally by reference numeral 50, for supporting the terminal leads 30a-30d in the stator housing 12 of auxiliary generator 10. The bracket assembly 50 includes a first bracket 52 adapted and configured to be fastened to the stator housing 12 of the generator 10 at the existing fasteners locations 26a-26d that were previously used for fastening stator flange washers 24a and 24c, and serving to retain the main stator within the stator housing 12. As best seen in FIG. 4, the first bracket 52 has four fastener ports 23a-23d for receiving four fasteners 25a-25d that are employed at fastener locations 26a-26d to secure the first bracket 52 of bracket assembly 50 to the stator housing 12.

The bracket assembly 50 includes a second bracket 54 adapted and configured to be fastened to a raised top mounting surface portion 52a of the first bracket 52 at four fastener locations 53a-53d, using four corresponding fasteners 55a-55d that extend through four apertures 57a-57d in the second bracket 54. The bracket assembly 50 further includes four generally P-shaped terminal lead clamps 56a-56d for respectively securing the four terminal leads 30a-30b to the top surface 54a of the second bracket 54. More particularly, the second bracket 54 of bracket assembly 50 includes four mounting ports 58a-58d for respectively receiving corresponding fasteners 60a-60d that secure the terminal clamps 56a-56d to the second bracket 54 of bracket assembly 50.

The first bracket 52 of bracket assembly 50 has a generally arcuate configuration extending through a first arc length and the second bracket 54 of bracket assembly 50 has a generally arcuate configuration extending through a second arc length that is less than the first arc length. Preferably, the bracket assembly 50 has a di-electric construction. More particularly, the first bracket 52 of bracket assembly 50 is formed from a metal material and the second bracket 54 of bracket assembly 50 is formed from a thermoset plastic material. In particular, the first bracket 52 of bracket assembly 50 is formed from steel or a similar metal material, and the second bracket 54 of bracket assembly 50 is formed from a polyamide-imide or a similar plastic material.

Figure 5:
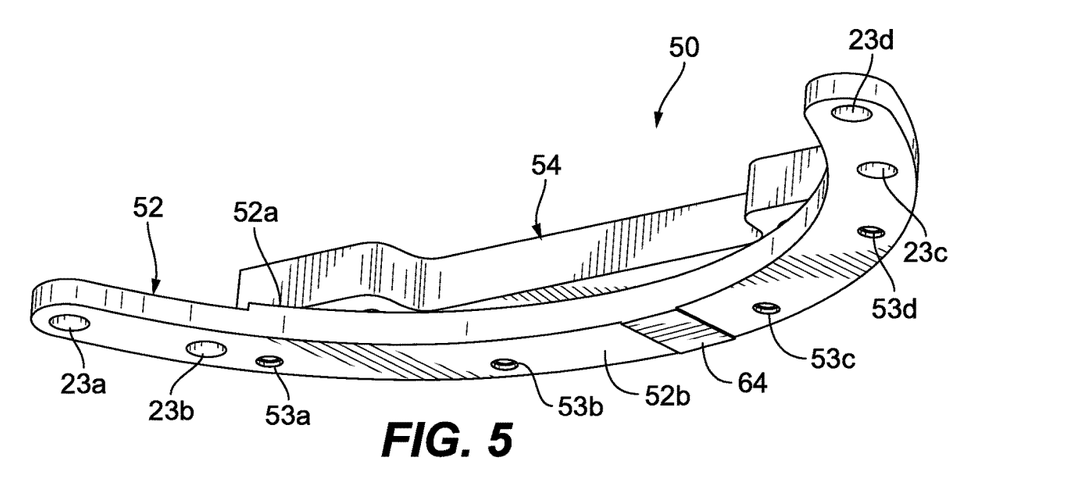
FIG. 5 is a perspective view of the bracket assembly of the subject invention.
Figure 6:
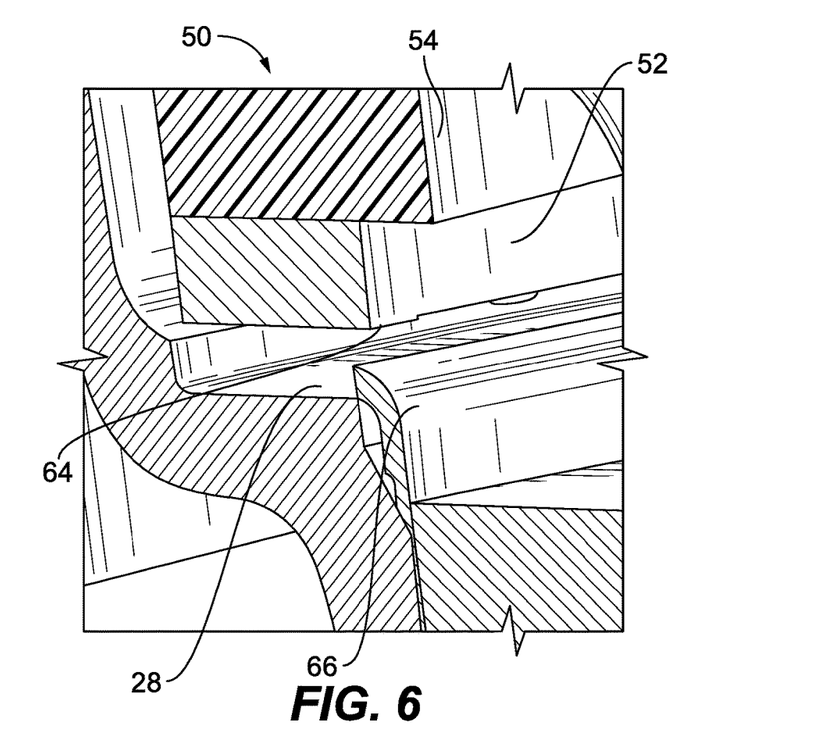
FIG. 6 is an enlarged localized view of the bracket assembly of the subject invention, taken along line 6-6 of FIG. 4, when it is being installed in the stator housing, relative to the main stator sleeve, with a protrusion on the bottom bracket that applies a preload to the bracket assembly prevent vibration of the parts.
Figure 7:
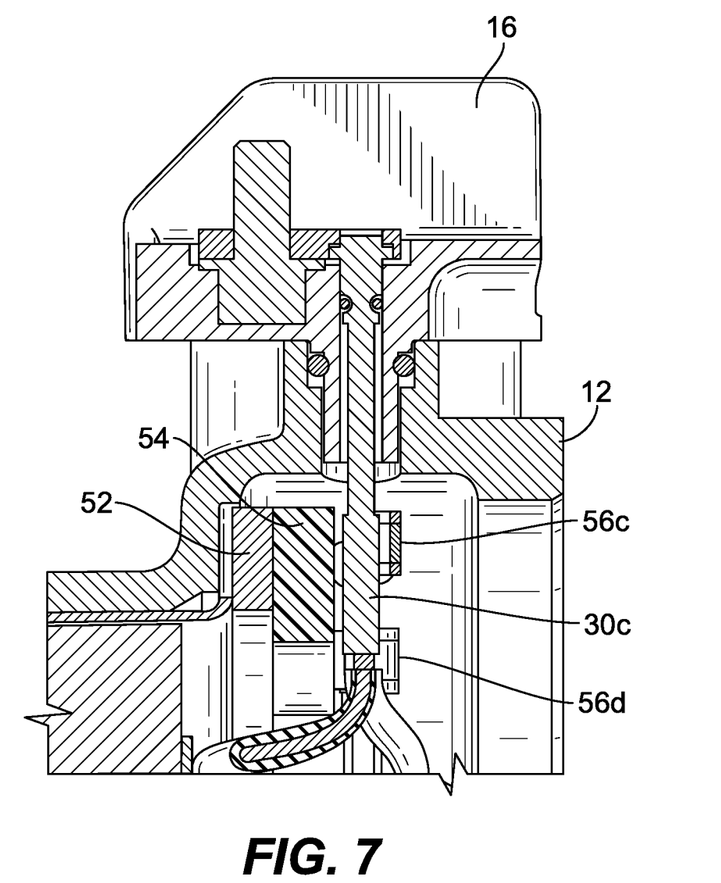
FIG. 7 is a cross-sectional view taken along line 7-7 of FIG. 3 illustrating the installed position of the bracket assembly.

As best seen in FIGS. 5 and 6, the first bracket 52 of bracket assembly 50 has a stepped protrusion 64 formed at the center of a bottom surface 52b thereof for contacting an annular stator sleeve 66 that is associated with the peripheral edge of the main stator flange 28 of the stator housing 12 of generator 10. The stepped protrusion 64 of bracket 52 is designed to advantageously apply a preload or bending force to the bracket 52 and therefore the bracket assembly 50 as a whole, to prevent vibration of the component parts of the bracket assembly 50. This is will further prevent or otherwise inhibit damage or disruption to the connections between the terminal leads 30a-30d and terminal block 16 of the stator housing 12, which is best seen for example in FIG. 7.

While the subject disclosure has been shown and described with reference to preferred embodiments, those skilled in the art will readily appreciate that changes and/or modifications may be made thereto without departing from the scope of the subject disclosure.

What is claimed is:

1. An auxiliary generator assembly for supporting terminal leads, comprising:
   a) a first metallic bracket fastened to a stator housing of the generator to retain a main stator within the stator housing, wherein the first metallic bracket is fastened to the stator housing with one or more fasteners passing through the first metallic bracket and into the stator housing; and b) a second non-metallic bracket fastened to a top surface of the first metallic bracket to support a plurality of terminal leads within the stator housing with the first metallic bracket axially between the second non-metallic bracket and a flange of the stator housing, wherein the second non-metallic bracket is fastened to the top surface of the first metallic bracket with one or more fasteners passing through the second non-metallic bracket and into the first metallic bracket.

2. An auxiliary generator assembly as recited in claim 1, wherein the first metallic bracket is fastened at existing fasteners locations previously used for fastening a pair of circumferentially spaced apart stator flange washers.

3. An auxiliary generator assembly as recited in claim 1, wherein the second non-metallic bracket includes a plurality of mounting locations to support a plurality of terminal lead clamps.

4. An auxiliary generator assembly as recited in claim 1, wherein the first bracket is formed from a metal material.

5. An auxiliary generator assembly as recited in claim 4, wherein the first bracket is formed from steel.

6. An auxiliary generator assembly as recited in claim 1, wherein the second bracket is formed from a plastic material.

7. An auxiliary generator assembly as recited in claim 6, wherein the second bracket is formed from polyamide-imide material.

8. An auxiliary generator assembly as recited in claim 1, wherein the first metallic bracket has a generally arcuate configuration extending through a first arc length and the second non-metallic bracket has a generally arcuate configuration extending through a second arc length that is less than the first arc length.

9. An auxiliary generator assembly as recite in claim 1, wherein the first metallic bracket has a stepped protrusion on a bottom surface thereof for contacting a stator sleeve to apply a preload force thereto to prevent vibrations.

10. An auxiliary generator assembly as recited in claim 1, further comprising a plurality of terminal lead clamps for securing the terminal leads to a top surface of the second non-metallic bracket.

11. An auxiliary generator assembly for supporting terminal leads, comprising:
    a) a first metallic bracket fastened to a stator housing of the generator at existing fasteners locations previously used for fastening a pair of circumferentially spaced apart stator flange washers, and serving to retain a main stator within the stator housing, wherein the first metallic bracket is fastened to the stator housing with one of more fasteners passing through the first metallic bracket and into the stator housing; and
    b) a second non-metallic bracket fastened to a top surface of the first bracket and including mounting locations for supporting a plurality of terminal lead clamps with the first metallic bracket axially between the second non-metallic bracket and a flange of the stator housing, wherein the second non-metallic bracket is fastened to the top surface of the first metallic bracket with one or more fasteners passing through the second non-metallic bracket and into the first metallic bracket.

12. An auxiliary generator assembly as recited in claim 11, wherein the first bracket is formed from steel and the second bracket assembly is formed from a plastic material.

13. An auxiliary generator assembly as recited in claim 11, wherein the first bracket has a generally arcuate configuration extending through a first arc length and the second bracket has a generally arcuate configuration extending through a second arc length that is less than the first arc length.

14. An auxiliary generator assembly for supporting terminal leads, comprising:
    a) a first metallic bracket fastened to a stator housing of the generator at existing fasteners locations previously used for fastening a pair of circumferentially spaced apart stator flange washers, and serving to retain a main stator within the stator housing, wherein the first metallic bracket is fastened to the stator housing with one or more fasteners passing through the first metallic bracket and into the stator housing; and
    b) a second non-metallic bracket fastened to a top surface of the first bracket and including mounting locations for supporting a plurality of terminal lead clamps, wherein the first bracket has a stepped protrusion on a bottom surface thereof for contacting a stator sleeve to apply a preload force thereto to prevent vibrations, wherein the second non-metallic bracket is fastened to the top surface of the first metallic bracket with one or more fasteners passing through the second non-metallic bracket and into the first metallic bracket.

15. An auxiliary generator assembly as recited in claim 11, further comprising a plurality of terminal lead clamps for securing a corresponding number of terminal leads to a top surface of the second bracket.

\* \* \* \* \*